US011984027B2

(12) United States Patent
Tsuge

(10) Patent No.: US 11,984,027 B2
(45) Date of Patent: May 14, 2024

(54) VEHICLE WITH EMERGENCY REPORTING FUNCTION, AND SERVER

(71) Applicant: SUBARU CORPORATION, Tokyo (JP)

(72) Inventor: Masatoshi Tsuge, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/855,262

(22) Filed: Jun. 30, 2022

(65) Prior Publication Data

US 2023/0025199 A1 Jan. 26, 2023

(30) Foreign Application Priority Data

Jul. 21, 2021 (JP) ................................ 2021-120770
Apr. 29, 2022 (JP) ................................ 2022-075569

(51) Int. Cl.
*G08G 1/0965* (2006.01)

(52) U.S. Cl.
CPC .................................. *G08G 1/0965* (2013.01)

(58) Field of Classification Search
CPC ........ G08G 1/0965; G08G 1/202; H04W 4/90
See application file for complete search history.

(56) References Cited

U.S. PATENT DOCUMENTS 6,028,537 A * 2/2000 Suman .................. B60K 35/00 340/988
6,262,655 B1 * 7/2001 Yoshioka ................ B60Q 1/52 379/442
6,337,641 B1 * 1/2002 Yoshioka ............ G08B 25/016 340/988
6,873,837 B1 * 3/2005 Yoshioka ................ B60Q 1/52 381/59
7,200,409 B1 * 4/2007 Ichikawa ............ G08B 25/016 455/556.1
7,274,924 B2 * 9/2007 Yoshioka ............ G08B 25/016 455/345

(Continued)

FOREIGN PATENT DOCUMENTS

JP 11-219488 A 8/1999
WO 2016/170610 A1 10/2016

*Primary Examiner* — Hoi C Lau
(74) *Attorney, Agent, or Firm* — Rimon P.C.

(57) ABSTRACT

A vehicle with an emergency reporting function includes a vehicle communicator, an emergency reporting switch, a user interface, and a processor. The vehicle communicator transmits an emergency report about an emergency involving the vehicle to a server to make a request for an emergency response. The processor generates an emergency report and causes the vehicle communicator to transmit the emergency report if the vehicle is involved in an emergency. If the emergency reporting switch is manually operated by an occupant of the vehicle upon occurrence of the emergency, the processor presents emergency category items to allow the occupant to select a category item among the emergency category items on the user interface, generates the emergency report based on a manual operation about the category item selected by the occupant, and causes the vehicle communicator to transmit the emergency report based on the manual operation.

10 Claims, 8 Drawing Sheets

(56) References Cited

U.S. PATENT DOCUMENTS 8,538,374 B1 * 9/2013 Haimo ................. H04M 3/5116 455/410
8,761,720 B2 * 6/2014 Ray ....................... H04W 76/50 455/456.3
8,923,803 B2 * 12/2014 Ray ......................... G10L 13/00 455/404.1
9,384,491 B1 * 7/2016 Briggs .................... H04W 4/44
9,619,844 B2 * 4/2017 Al-Harthi .............. G06Q 50/01
9,628,975 B1 * 4/2017 Watkins ................ H04W 4/027
9,786,154 B1 * 10/2017 Potter .................... G08B 21/02
9,913,099 B2 * 3/2018 Watkins ................. G06Q 40/08
10,163,327 B1 * 12/2018 Potter ..................... B60R 25/04
10,399,523 B1 * 9/2019 Christensen ........... B60Q 5/006
10,440,514 B2 * 10/2019 Watkins ................ H04W 4/027
10,623,899 B2 * 4/2020 Watkins ................ H04W 4/027
10,814,812 B1 * 10/2020 Christensen ........... G08G 1/205
10,825,326 B1 * 11/2020 Potter .................... G08B 21/02
10,829,071 B1 * 11/2020 Christensen ........... B60Q 5/006
10,997,849 B1 * 5/2021 Potter ................... B60W 40/09
11,051,127 B2 * 6/2021 Watkins ................ H04W 4/029
11,069,221 B1 * 7/2021 Potter .................... G08B 25/00
11,521,476 B2 * 12/2022 Mishra ..................... B60N 2/28
11,634,102 B2 * 4/2023 Potter ................... B60R 25/102 340/436
11,634,103 B2 * 4/2023 Potter ..................... B60R 25/04 340/436
11,770,681 B2 * 9/2023 Watkins ................ H04W 4/027 455/404.2
2002/0099498 A1 * 7/2002 Hilleary ................... G08G 1/20 701/532
2002/0099501 A1 * 7/2002 Hilleary ................. G06Q 10/08 340/988
2002/0099502 A1 * 7/2002 Hilleary ............... G08B 25/016 340/988
2002/0099793 A1 * 7/2002 Hilleary ............... G08G 1/0962 709/218
2002/0103622 A1 * 8/2002 Burge ..................... G16Z 99/00 702/183
2003/0083079 A1 * 5/2003 Clark ............... G08G 1/096716 455/466
2003/0117274 A1 * 6/2003 Kuragaki ............... G08G 1/205 340/436
2004/0166828 A1 * 8/2004 Yosioka ............... G08B 25/016 455/344
2006/0197681 A1 * 9/2006 Koie ........................ G08G 1/20 340/901
2006/0293812 A1 * 12/2006 Koie ...................... G01C 21/36 340/425.5
2007/0078570 A1 * 4/2007 Dai ...................... G08G 1/0104 701/1
2007/0224941 A1 * 9/2007 Yoshioka ............. G08B 25/016 455/66.1
2008/0122614 A1 * 5/2008 Sakai ................... G08B 25/016 340/539.18
2008/0143497 A1 * 6/2008 Wasson .................. G08G 1/205 340/425.5
2008/0203814 A1 * 8/2008 Kamiya .............. B60R 21/0134 307/10.1
2008/0258890 A1 * 10/2008 Follmer ................. G08G 1/052 340/439
2009/0167524 A1 * 7/2009 Chesnutt ................. H04L 51/18 340/539.19
2010/0003946 A1 * 1/2010 Ray ......................... H04W 4/90 455/404.1
2010/0003958 A1 * 1/2010 Ray ......................... H04W 4/90 455/404.2
2011/0193695 A1 * 8/2011 Koie ...................... G08G 1/205 340/438
2011/0202591 A1 * 8/2011 Reis ....................... G06Q 10/08 709/246
2013/0106594 A1 * 5/2013 Hiramatsu .............. H02J 9/002 340/436
2013/0325943 A1 * 12/2013 Al-Harthi .............. G06Q 50/01 709/204
2014/0114691 A1 * 4/2014 Pearce ................... G06Q 40/08 705/4
2014/0253308 A1 * 9/2014 Kanda .................... G08G 1/205 340/436
2014/0297100 A1 * 10/2014 Miura .................. G08B 25/016 701/31.5
2015/0127570 A1 * 5/2015 Doughty .............. G06Q 50/265 705/325
2016/0092962 A1 * 3/2016 Wasserman ........... H04M 3/487 705/26.7
2016/0373578 A1 * 12/2016 Klaban ................... B60R 25/33
2017/0164158 A1 * 6/2017 Watkins ................ H04W 4/027
2017/0263120 A1 * 9/2017 Durie, Jr. ............... G08G 1/205
2018/0013889 A1 * 1/2018 Klaban ............. H04M 3/42195
2018/0029553 A1 2/2018 Hamakami
2018/0146341 A1 * 5/2018 Watkins ................ H04W 4/029
2019/0082300 A1 * 3/2019 Watkins .................. H04W 4/90
2019/0281416 A1 * 9/2019 Watkins ................. G06Q 40/08
2019/0318609 A1 * 10/2019 Obayuwana ........... B60Q 5/005
2019/0391581 A1 * 12/2019 Vardaro ............. A61B 5/02055
2020/0005642 A1 * 1/2020 Kim ...................... G05D 1/0214
2020/0029194 A1 * 1/2020 Speaker ................ H04W 4/027
2020/0267503 A1 * 8/2020 Watkins ................ H04W 4/029
2021/0314731 A1 * 10/2021 Watkins ................ H04W 4/027
2022/0038873 A1 * 2/2022 Nagasawa ............ G08G 1/0965
2022/0038880 A1 * 2/2022 Nagasawa ............... H04W 4/44
2022/0189281 A1 * 6/2022 Mishra ................... G08B 5/226
2023/0021599 A1 * 1/2023 Tsuge ...................... H04W 4/44
2023/0025199 A1 * 1/2023 Tsuge ..................... G08G 1/202
2023/0104680 A1 * 4/2023 Furukawa ............. H01M 10/42 714/14
2023/0112713 A1 * 4/2023 Mishra ................... G08B 21/24 340/457

* cited by examiner 61, 12

| INFORMATION ON EMERGENCY RESPONDER | ABILITY TO RESPOND | POSITION INFORMATION |
|---|---|---|
| FIRST WRECKER | GETTING STUCK (NO WEIGHT LIMITATION) | ADDRESS |
| SECOND WRECKER | GETTING STUCK (UP TO 2 TONS) | ADDRESS |
| FIRST ROAD SERVICE | GETTING STUCK (UP TO 2 TONS), FLAT BATTERY | ADDRESS |
| FIRST FUEL SERVICE | FLAT BATTERY, REFUELING | ADDRESS |
| FIRST USER | SUV, BOOSTER CABLE, ELECTRIC | CURRENT LOCATION |
| SECOND USER | SUV, BOOSTER CABLE, HYBRID | CURRENT LOCATION |
| THIRD USER | TRUCK, HYBRID | CURRENT LOCATION |
| FOURTH USER | COMPACT CAR, GASOLINE | CURRENT LOCATION |
| ⋮ | ⋮ | ⋮ |

FIG. 10

VEHICLE WITH EMERGENCY REPORTING FUNCTION, AND SERVER

CROSS-REFERENCE TO RELATED APPLICATIONS

The present application claims priority from Japanese Patent Application Nos. 2021-120770 filed on Jul. 21, 2021 and 2022-075569 filed on Apr. 29, 2022, the entire contents of each of which are hereby incorporated by reference.

BACKGROUND

The technology relates to a vehicle with an emergency reporting function, and to a server.

A vehicle, such as an automobile, can come into collision with another automobile while traveling, or an occupant of the automobile can feel sick. In this case, the automobile makes an emergency report to an operator of an emergency support center. For example, reference is made to Japanese Unexamined Patent Application Publication No. H11-219488 and International Publication No. WO 2016/170610.

In response to an emergency report, the operator of the emergency support center makes a dispatch request of a dispatch team. The dispatch team rushes to a site where the automobile that has made the emergency report is present by an emergency vehicle, for example, to execute an emergency response.

This enables the automobile and the occupant involved in an emergency to receive the emergency response.

SUMMARY

An aspect of the technology provides a vehicle with an emergency reporting function. The vehicle includes a vehicle communicator, an emergency reporting switch, a user interface, and a processor. The vehicle communicator is configured to transmit an emergency report about an emergency involving the vehicle to a server to make a request for an emergency response. The emergency reporting switch is manually operable by an occupant of the vehicle. The user interface is provided in the vehicle to be used by the occupant of the vehicle. The processor is configured to generate the emergency report and cause the vehicle communicator to transmit the emergency report. In a case where the emergency reporting switch is manually operated by the occupant of the vehicle, the processor is configured to: present emergency category items to allow the occupant to select an emergency category item among the emergency category items on the user interface; generate the emergency report based on a manual operation about the emergency category item selected by the occupant; and cause the vehicle communicator to transmit the emergency report based on the manual operation to the server.

An aspect of the technology provides a server to be used to make, of an emergency responder that is able to respond in an emergency, a dispatch request for a vehicle that has reported an emergency. The server includes a server communicator, a server memory, and a server processor. The server communicator is configured to receive an emergency report transmitted from the vehicle. The emergency report includes information associated with a category of the emergency. The server memory is configured to hold information on emergency responders that are able to be called out. The server processor is configured to select, from the server memory, information on one or more of the emergency responders to be called out based on the emergency report, in a case where the server communicator receives the emergency report from the vehicle.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the technology.

FIG. 10 is an explanatory diagram illustrating an example of an emergency responder table that is held in a memory of the server illustrated in FIG. 1.

DETAILED DESCRIPTION

Multiple simultaneous emergencies can occur frequently. In this case, making a request for emergency dispatch of a specialized emergency response dispatch team, such as ambulance service or a wrecker, for all emergency reports can make it difficult to respond to the emergencies.

In addition, emergencies involving a vehicle include not only a serious, heavy emergency, such as an accident or an emergency of an occupant, but also a simple emergency, such as getting stuck, a flat battery, or fuel shortage of the vehicle. In a simple emergency, it is even possible for a user of another vehicle present near the vehicle involved in the emergency, for example, to respond to the emergency, instead of a specialized emergency response dispatch team.

It is desirable to provide a vehicle with an emergency reporting function and a server that enable various responses to be made for an emergency involving the vehicle.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
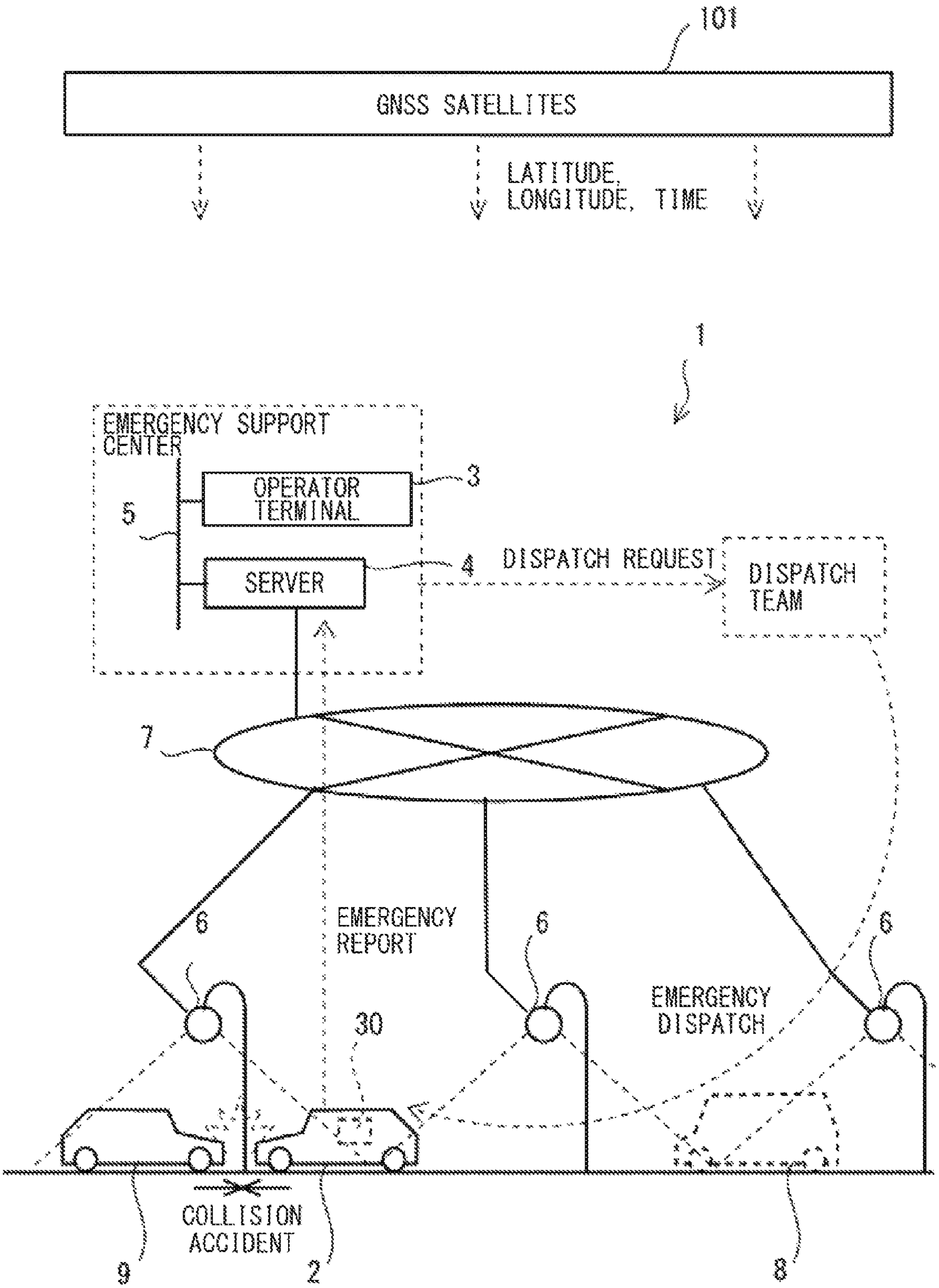
FIG. 1 is an explanatory diagram illustrating an automatic emergency reporting system for an automobile, according to one example embodiment of the technology.

FIG. 1 is an explanatory diagram illustrating an automatic emergency reporting system 1 for an automobile 2, according to an example embodiment of the technology.

The automatic emergency reporting system 1 illustrated in FIG. 1 may include the automobile 2 supporting the system, and an operator terminal 3 and a server 4 of an emergency support center.

The automobile 2 is an example of a vehicle that is able to travel while carrying an occupant. A control system 30 of the automobile 2 may establish, via a mobile communicator 33 to be described later, a communication path with a base station 6 among a plurality of base stations 6. The base station 6 may include, in its zone, a road on which the automobile 2 travels. The plurality of base stations 6 may be coupled to a communication network 7. The base station 6 and the communication network 7 may be a 5G base station and a 5G communication network provided by a carrier. In another example, the base station 6 and the communication network 7 may be an advanced driver assistance system (ADAS)-dedicated base station and an ADAS-dedicated communication network provided by, for example, a public institution.

The server 4 may be coupled to the communication network 7 and to a local area network 5 of the emergency support center, via a communication device 17 to be described later. The operator terminal 3 may be coupled to the local area network 5.

The automobile 2 can come into collision with another automobile 9 while traveling, or an occupant, such as an owner who drives the automobile 2, can feel sick. In a case where the automobile 2 is thus involved in an emergency, the control system 30 of the automobile 2 may transmit an emergency report to the server 4 of the emergency support center from the mobile communicator 33 to be described later, through the base station 6 and the communication network 7.

At the emergency support center, the server 4 receives an emergency report from the automobile 2 involved in an emergency. An operator of the emergency support center may use the operator terminal 3, for example, to read information about the automobile 2 involved in the emergency from the server 4. The operator may place a phone call to the occupant of the automobile 2 to inquire about, for example, a degree of injury on an as-needed basis, and make a dispatch request of an emergency response dispatch team. Note that the dispatch request for the automobile 2 with an emergency reporting function may be made of the emergency response dispatch team by the server 4. The emergency response dispatch team may rush to a site where the automobile 2 that has made the emergency report is present, by an emergency vehicle 8, to execute an emergency response.

This enables the automobile 2 and the occupant involved in the emergency to receive the emergency response executed by the dispatch team.

Figure 2:
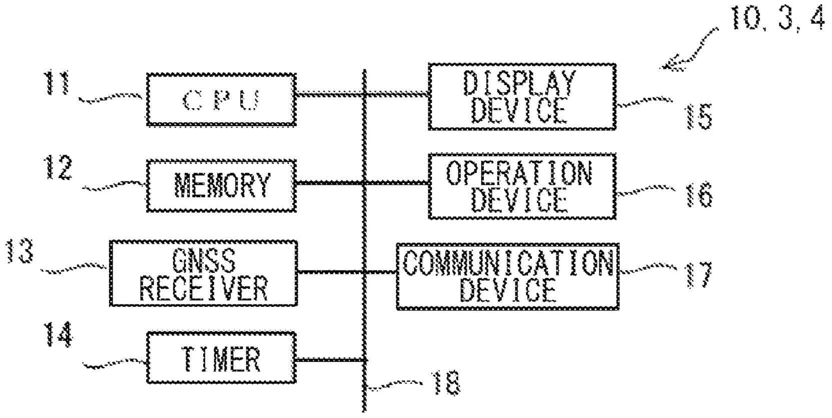
FIG. 2 is an explanatory diagram illustrating a computer that may be used as a server or an operator terminal illustrated in FIG. 1.

FIG. 2 is an explanatory diagram illustrating a computer 10 that may be used as the server 4 or the operator terminal 3 illustrated in FIG. 1.

The computer 10 illustrated in FIG. 2 may include a central processing unit (CPU) 11, a memory 12, a global navigation satellite system (GNSS) receiver 13, a timer 14, a display device 15, an operation device 16, the communication device 17, and a server bus 18 that couples these components. Note that the computer 10 serving as the server 4 may include the CPU 11, the memory 12, the GNSS receiver 13, the timer 14, and the communication device 17. The computer 10 serving as the operator terminal 3 may include an unillustrated microphone and an unillustrated speaker to be used for a phone call.

The communication device 17 may be coupled to the communication network 7 or the local area network 5. The communication device 17 may transmit and receive communication data of the computer 10. For example, the communication device 17 of the server 4 receives an emergency report from the automobile 2. In one embodiment, the communication device 17 of the server 4 may serve as a "server communicator".

The display device 15 may be a liquid crystal monitor, for example. The display device 15 may display a screen for, for example, the operator. Non-limiting examples of the display screen of the display device 15 may include an emergency report screen, a phone call screen, and a dispatch request screen.

The emergency report screen may be a screen that displays, for example, presence or absence of an emergency report acquired from the server 4 and details of the emergency report. Non-limiting examples of the details of the emergency report may include a site, i.e., a position of the automobile 2 that has made the emergency report, a report time, and a reported or predicted state about the automobile 2 and the occupant. Presence or absence of another emergency report issued near the automobile 2 may also be displayed, for example.

The phone call screen may be, for example, an outgoing call screen for the automobile 2 from which the emergency report has been received or a mobile terminal of the occupant thereof.

The dispatch request screen may be a request screen for a dispatch team present near the site where an emergency has occurred.

The operation device 16 may be a keyboard, a pointing device, a touch panel, or a button, for example. The operation device 16 may be operated by the operator. The operator may operate the operation device 16 to, for example, switch the display screen of the display device 15.

The GNSS receiver 13 may receive radio waves from GNSS satellites 101 illustrated in FIG. 1, and generate a current time. The GNSS receiver 13 may obtain a position where the computer 10 is installed, together with the current time.

The timer 14 may measure a time period or a time. The time of the timer 14 may be calibrated by the current time of the GNSS receiver 13.

The memory 12 may hold a program and data to be used to cause the computer 10 to serve as the server 4 or the operator terminal 3. For example, the memory 12 of the server 4 holds information on a plurality of emergency responders that are able to be called out. In one embodiment, the memory 12 of the server 4 may serve as a "server memory".

The CPU 11 may read the program from the memory 12 and execute the program. This enables the CPU 11 to serve as a processor that controls overall operation of the server 4 or a processor that controls overall operation of the operator terminal 3.

In a case where the communication device 17 receives an emergency report from the automobile 2, the CPU 11 serving as the processor of the server 4 selects, from the memory 12, information on the emergency responder to be called out. In addition, the CPU 11 serving as the processor of the server 4 may make, of an emergency response dispatch team, a dispatch request for the automobile 2 that has reported emergency. In one embodiment, the CPU 11 serving as the processor of the server 4 may serve as a "server processor".

The CPU 11 serving as the processor of the operator terminal 3 may, in response to the operator's operation on the display screen, access the server 4 to acquire information related to the emergency report from the server 4, and switch the display of the display device 15.

Figure 3:
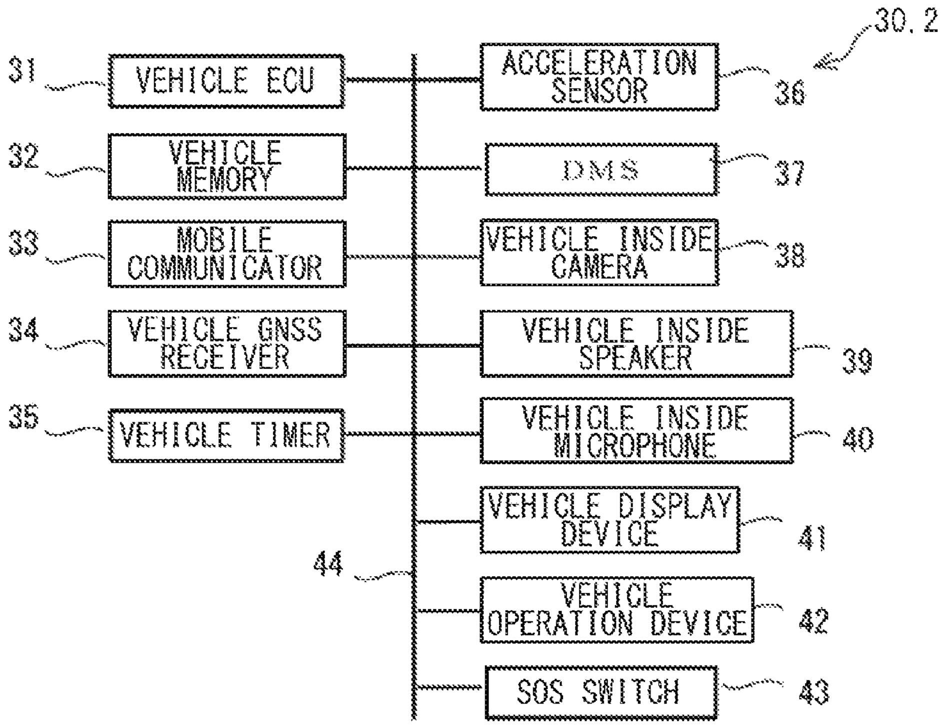
FIG. 3 is an explanatory diagram illustrating a control system of the automobile illustrated in FIG. 1.

FIG. 3 is an explanatory diagram illustrating the control system 30 of the automobile 2 illustrated in FIG. 1.

The control system 30 of the automobile 2 illustrated in FIG. 3 may include a vehicle electronic control unit (ECU) 31, a vehicle memory 32, the mobile communicator 33, a vehicle GNSS receiver 34, a vehicle timer 35, an acceleration sensor 36, an occupant monitoring device (e.g., a driver monitoring system (DMS)) 37, a vehicle inside camera 38, a vehicle inside speaker 39, a vehicle inside microphone 40, a vehicle display device 41, a vehicle operation device 42, a SOS switch 43, and a vehicle network 44 that couple these components.

The vehicle network 44 may be a wired communication network conforming to a controller area network (CAN) or a local interconnect network (LIN), for example, for the automobile 2. The vehicle network 44 may be a communication network such as a local area network (LAN), or may be a combination of such communication networks. The vehicle network 44 may partly include a wireless communication network.

The vehicle GNSS receiver 34, the vehicle timer 35, the vehicle display device 41, the vehicle operation device 42, the vehicle inside speaker 39, and the vehicle inside microphone 40 may be similar to the corresponding components of the computer 10 illustrated in FIG. 2. Note that the vehicle operation device 42 may be, for example, a touch panel that is overlayed on the vehicle display device 41. The vehicle display device 41 may display, for example, a situation of automatic driving of the automobile 2 and an emergency report screen. In one embodiment, the vehicle display device 41 and the vehicle operation device 42 may serve as a "user interface" provided in the automobile 2 to be used by the occupant of the automobile 2.

The mobile communicator 33 may establish a communication path with the base station 6. The mobile communicator 33 may transmit and receive data to and from the communication device 17 of the server 4, through the base station 6 and the communication network 7. In one embodiment, the mobile communicator 33 may serve as a "vehicle communicator".

The acceleration sensor 36 may detect an acceleration of the automobile 2. The acceleration sensor 36 may detect a speed of the automobile 2. A sudden stop or collision of the automobile 2 causes an acceleration higher than a usual acceleration. The acceleration sensor 36 may detect an emergency, such as collision, of the automobile 2. In one embodiment, the acceleration sensor 36 may serve as a "detector".

The vehicle inside camera 38 may capture an image of a vehicle compartment of the automobile 2. The vehicle inside camera 38 may capture an image of only the owner of the automobile 2 or an image of the entire vehicle compartment.

The occupant monitoring device 37 may identify the owner and a passenger riding the automobile 2 and monitor a state of each occupant, on the basis of the image captured by the vehicle inside camera 38. The occupant can doze, look aside, or have an abnormal heart rate. The occupant monitoring device 37 may detect an abnormality about a health state of the occupant on the basis of, for example, the abnormal heart rate. The occupant monitoring device 37 may detect an emergency of the occupant by detecting, for example, an irregular state about the occupant. In one embodiment, the occupant monitoring device 37 may serve as the "detector".

The SOS switch 43 may be an independent physical button provided on a steering wheel or a shift knob, for example, inside the automobile 2. The SOS switch 43 is operated by the occupant in emergency. The SOS switch 43 may accordingly be provided at a position easy for the occupant to operate. Non-limiting examples of the occupant may include a driver who drives the automobile 2. The SOS switch 43 may be provided with a part such as a button cover to suppress an unintended erroneous operation. In one embodiment, the SOS switch 43 may serve as an "emergency reporting switch" to be manually operated by the occupant of the automobile 2 in an emergency.

Note that, in the example embodiment, the SOS switch 43 may be separate from the user interface implemented by the vehicle display device 41 and the vehicle operation device 42 described above.

In another example, the SOS switch 43 may be provided in the automobile 2 in an integrated state of being incorporated in the vehicle operation device 42 described above. In another example, the SOS switch 43 may be displayed on the vehicle display device 41 to be operable by the vehicle operation device 42.

The vehicle memory 32 may hold a program and data.

The vehicle ECU 31 may read the program from the vehicle memory 32 and execute the program. This enables the vehicle ECU 31 to serve as a processor that controls overall operation, including travel control, of the automobile 2.

The vehicle ECU 31 serving as the processor of the automobile 2 may control travel of the automobile 2 based on the automatic driving, for example.

Collision can be detected by a detection value of the acceleration sensor 36 exceeding a threshold, or an abnormality or irregularity in the health state of the occupant can be detected by the occupant monitoring device 37, for example. In such a case, the vehicle ECU 31 may determine that the automobile 2 is involved in an emergency on the basis of the detection. The vehicle ECU 31 of the automobile 2 involved in the emergency may generate an emergency report, and cause the mobile communicator 33 to automatically transmit the emergency report to the server 4. The mobile communicator 33 serving as the vehicle communicator transmits the emergency report about the emergency involving the automobile 2 to the server 4 to make a request for an emergency response.

Figure 4:
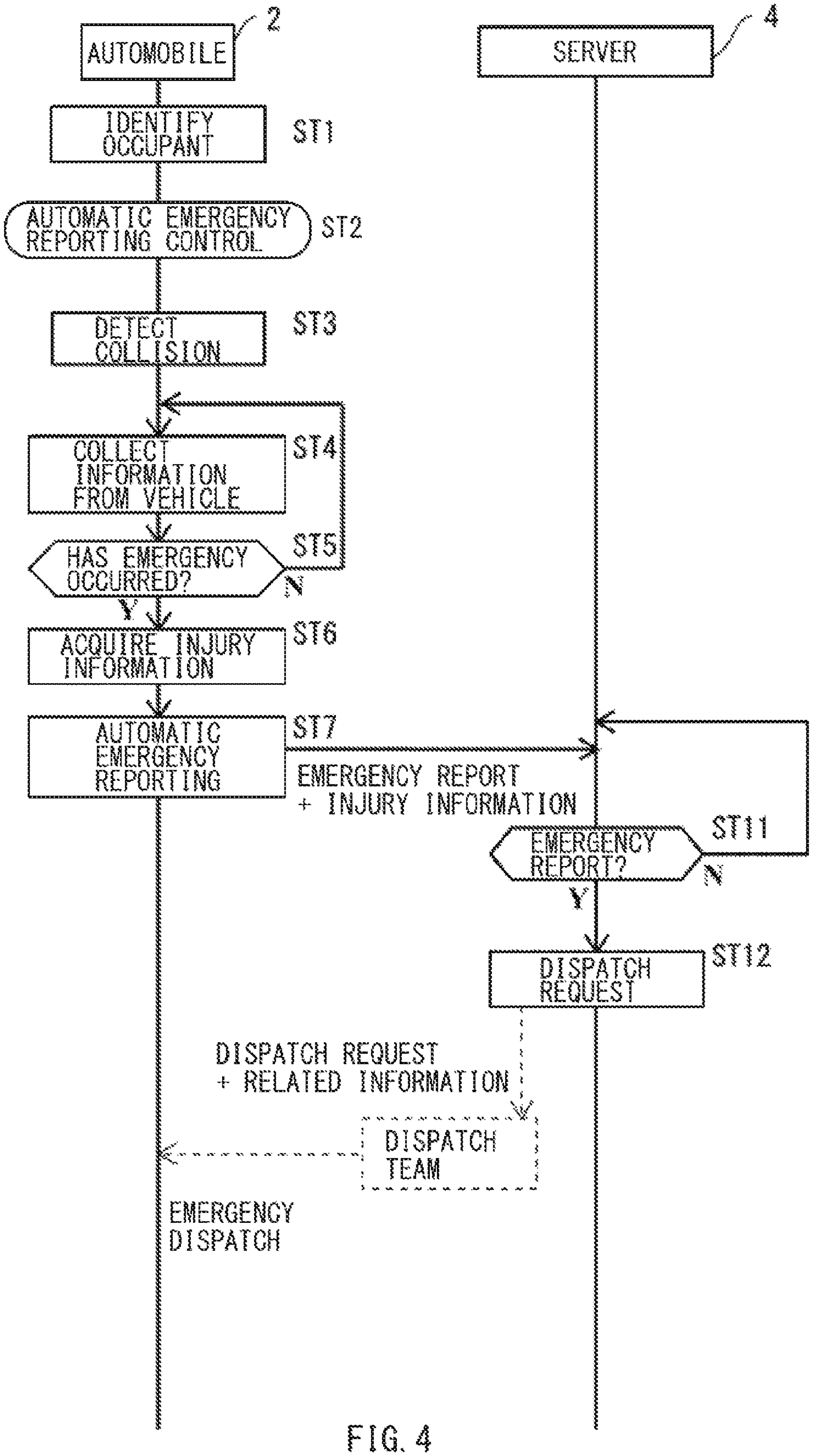
FIG. 4 is a timing chart illustrating an example flow of automatic emergency reporting in the entire automatic emergency reporting system illustrated in FIG. 1.

FIG. 4 is a timing chart illustrating an example flow of automatic emergency reporting in the entire automatic emergency reporting system 1 illustrated in FIG. 1.

FIG. 4 illustrates the automobile 2 and the server 4. In FIG. 4, time flows from the top to the bottom.

FIG. 4 illustrates an example of emergency reporting in a case of collision of the automobile 2. Reporting in another emergency may be similar to the reporting in FIG. 4.

In step ST1, the vehicle ECU 31 of the automobile 2 may identify the occupant riding the automobile 2. The vehicle ECU 31 may identify the riding occupant by means of, for example, the occupant monitoring device 37.

In step ST2, the vehicle ECU 31 of the automobile 2 may start emergency reporting control.

In step ST3, the vehicle ECU 31 of the automobile 2 may detect collision of the automobile 2. The vehicle ECU 31 may detect the collision of the automobile 2, for example, if the detection value of the acceleration sensor 36 exceeds the threshold. The vehicle ECU 31 may detect the collision of the automobile 2 by predicting unavoidable collision of the automobile 2.

In step ST4, the vehicle ECU 31 of the automobile 2 may collect information from the automobile 2. The vehicle ECU 31 may collect information about the state of the occupant after the collision detection, for example, by means of the occupant monitoring device 37. The occupant can be hurt or injured by the collision or can be unconscious.

In step ST5, the vehicle ECU 31 of the automobile 2 may determine whether an emergency for which an emergency report is to be made has occurred. The vehicle ECU 31 may determine whether an emergency for which an emergency report is to be made has occurred, for example, on the basis of a degree of impact applied by the collision, or presence or absence of consciousness or a motion of the occupant, such as the owner. If an emergency for which an emergency report is to be made has occurred (ST5: Y), the vehicle ECU 31 may cause the flow to proceed to step ST6. If an emergency for which an emergency report is to be made has not occurred (ST5: N), the vehicle ECU 31 may cause the flow to return to step ST4. This enables the vehicle ECU 31 to keep monitoring about the state after the collision detection.

In step ST6, the vehicle ECU 31 of the automobile 2 may acquire injury information of the occupant. For example, the vehicle ECU 31 may acquire, as the injury information of the occupant, the information about the state of the occupant after the collision detection acquired in step ST4.

In step ST7, the vehicle ECU 31 of the automobile 2 may automatically transmit an emergency report. The vehicle ECU 31 may transmit, to the server 4 via the mobile communicator 33, an emergency report indicating that the automobile 2 is involved in the emergency due to an accident. The emergency report thus automatically transmitted may include the injury information of the occupant.

In a case where an emergency of the automobile 2 or the occupant is detected, the vehicle ECU 31 of the automobile 2 may thus generate an emergency report about the emergency involving the automobile 2, and cause the mobile communicator 33 to automatically transmit the emergency report to the server 4.

In step ST11, the CPU 11 of the server 4 may determine whether an emergency report has been received. The server 4 may receive the emergency report transmitted by the vehicle ECU 31 of the automobile 2 in step ST7. If no emergency report has been received (ST11: N), the CPU 11 of the server 4 may repeat this process. If an emergency report is received (ST11: Y), the CPU 11 of the server 4 may cause the flow to proceed to step ST12.

In step ST12, the CPU 11 of the server 4 may output a dispatch request to a dispatch team on the basis of, for example, information included in the emergency report.

In response to the dispatch request, the dispatch team may rush to a location of the automobile 2 from which the emergency report has been received, with the information included in the emergency report, and execute emergency response rescue work, for example.

Multiple simultaneous emergencies can occur frequently. In this case, making a request for emergency dispatch of a specialized emergency response dispatch team, such as ambulance service or a wrecker, for all emergency reports can exhaust emergency response resources, making it difficult to respond to the emergencies.

In addition, emergencies involving the automobile 2 include not only a serious, heavy emergency, such as an accident or an emergency of the occupant, but also a simple emergency, such as getting stuck, a flat battery, or fuel shortage of the automobile 2. In a simple emergency, it is even possible for a user of another automobile present near the automobile 2 involved in the emergency, for example, to respond to the emergency, instead of a specialized emergency response dispatch team.

Thus, it may be desired that the automobile 2 enable various responses to be made for an emergency involving the automobile 2.

Figure 5:
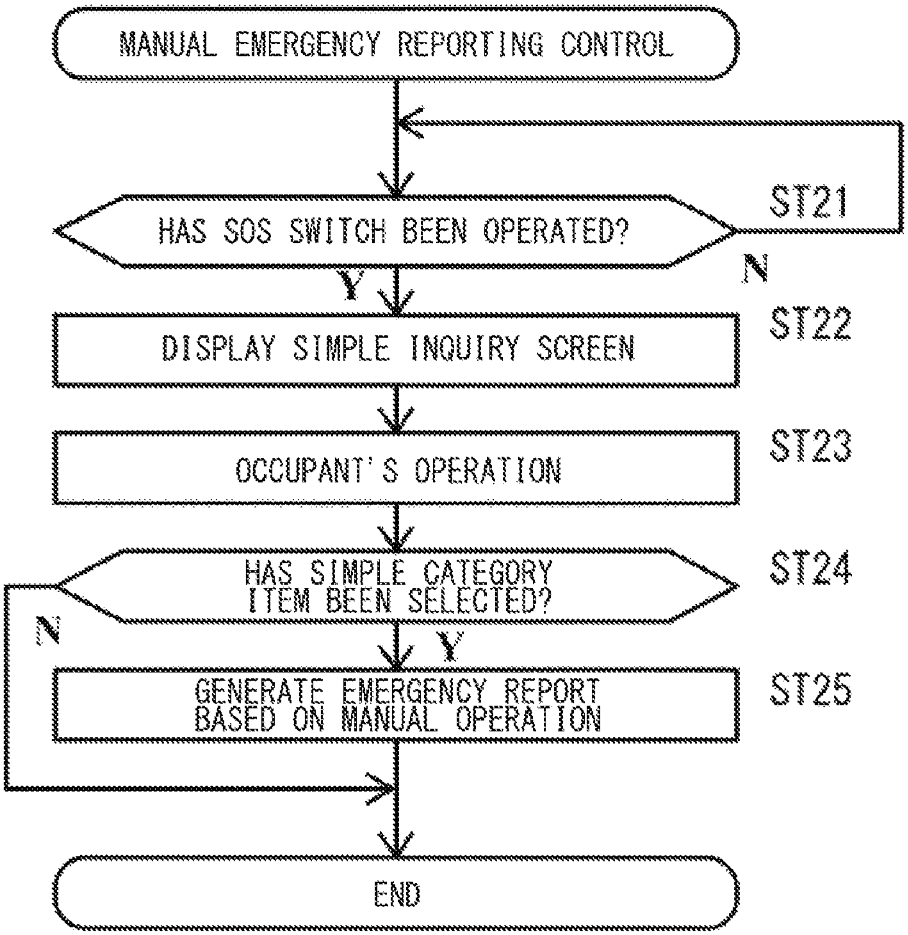
FIG. 5 is a flowchart illustrating manual emergency reporting control that may be performed by the automobile illustrated in FIG. 1.

FIG. 5 is a flowchart illustrating manual emergency reporting control that may be performed by the automobile 2 illustrated in FIG. 1.

The vehicle ECU 31 of the automobile 2 may repeatedly execute the control illustrated in FIG. 5.

In step ST21, the vehicle ECU 31 may determine whether the SOS switch 43 serving as the emergency reporting switch has been manually operated by the occupant of the automobile 2. If the SOS switch 43 has not been manually operated (ST21: N), the vehicle ECU 31 may repeat this process. If the SOS switch 43 is manually operated (ST21: Y), the vehicle ECU 31 may cause the flow to proceed to step ST22.

In step ST22, the vehicle ECU 31 may generate a simple inquiry screen to be displayed in a case where the SOS switch 43 is manually operated, and display the simple inquiry screen on the vehicle display device 41 serving as the user interface. A plurality of buttons selectable by a manual operation on the vehicle operation device 42 may be presented on the simple inquiry screen. Each of the buttons is associated with a different emergency category item from each other. The emergency category item includes information that indicates a category of the emergency. Each of the emergency category items is associated with a different category of the emergency from each other. On the simple inquiry screen, the emergency category items may be displayed by the buttons limited in number to five or less, for example, to prevent a burden on operations under an emergency due to an excessive number of buttons. The simple inquiry screen may also include, for example, a no-selection reporting button and a cancellation button. The no-selection reporting button may allow for manual emergency reporting without selecting a specific button.

In step ST23, the vehicle ECU 31 may acquire, from the vehicle operation device 42, the occupant's manual operation on the vehicle operation device 42 under a situation in which the simple inquiry screen including the buttons are displayed on the vehicle display device 41. The occupant may select one button corresponding to the present emergency, from among the buttons. Thus, the vehicle ECU 31 may present a plurality of emergency category items to allow the occupant to select an emergency category item on the user interface, e.g., the vehicle display device 41 and the vehicle operation device 42. Note that, the vehicle ECU 31 may present the plurality of emergency category items to allow the occupant to select one or more emergency category items on the user interface.

In step ST24, the vehicle ECU 31 may determine whether a button has been selected by the occupant's manual operation on the vehicle operation device 42. If an operation of not selecting a button has been performed (ST24: N), the vehicle ECU 31 may end this control. In this case, an emergency report based on a manual operation may not be generated. If an operation of selecting a button has been performed (ST24: Y), the vehicle ECU 31 may cause the flow to proceed to step ST25.

In step ST25, the vehicle ECU 31 may determine a manually selected emergency category item associated with the button selected by the occupant's manual operation, and may generate an emergency report based on the manually selected emergency category item. Thus, the vehicle ECU 31 may generate an emergency report based on a manual operation about the emergency category item manually operated by the occupant. This emergency report may be an emergency report that is generated in response to a manual operation performed on the SOS switch 43 serving as the emergency reporting switch by the occupant of the automobile 2, and may be different from the above-described automatic emergency report that the automobile 2 generates on the basis of its own emergency determination. The emergency report based on the manual operation may include information indicating that the emergency report is an emergency report based on a manual operation. The vehicle ECU 31 may temporarily record the generated emergency report based on the manual operation in the vehicle memory 32. Thereafter, the vehicle ECU 31 may end this control.

Figure 6:
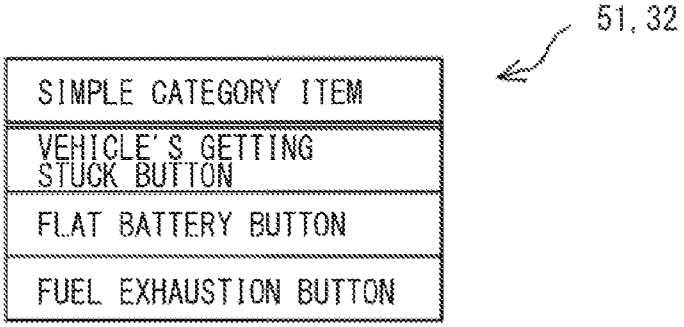
FIG. 6 is an explanatory diagram illustrating an example of a table of a plurality of emergency simple category items that is held in a vehicle memory illustrated in FIG. 3.

FIG. 6 is an explanatory diagram illustrating an example of a table 51 of a plurality of emergency category items that is held in the vehicle memory 32 illustrated in FIG. 3.

The table 51 of the plurality of emergency category items illustrated in FIG. 6 may include information on the automobile 2's getting stuck button, flat battery button, and fuel exhaustion button. These emergencies may be simple, one-time emergencies, as compared with, for example, an accident of the automobile 2 and sudden illness of the occupant. Even a user of another automobile is able to respond to the emergencies, instead of a specialized emergency response dispatch team. It is possible to respond to such emergencies between users of automobiles 2.

In this case, the vehicle ECU 31 may, in step ST22, generate the simple inquiry screen including the automobile 2's getting stuck button, flat battery button, and fuel exhaustion button, and display the simple inquiry screen on the vehicle display device 41.

Figure 7:
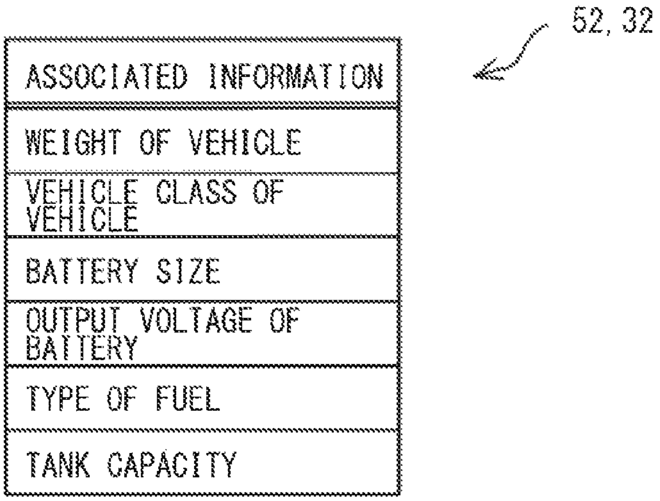
FIG. 7 is an explanatory diagram illustrating an example of an associated information table related to the emergency simple category items that is held in the vehicle memory illustrated in FIG. 3.

FIG. 7 is an explanatory diagram illustrating an example of an associated information table 52 related to the emergency category items that is held in the vehicle memory 32 illustrated in FIG. 3.

The associated information table 52 related to the emergency category items illustrated in FIG. 7 may hold information including, for example, a weight of the automobile 2, a vehicle class, e.g., a size, of the automobile 2, a standard size of a battery of the automobile 2, an output voltage of the battery of the automobile 2, a type of fuel of the automobile 2, and a capacity of a tank of the automobile 2.

In this case, in generating the emergency report based on the manual operation in step ST25, the vehicle ECU 31 may read and acquire, from the vehicle memory 32, information included in the associated information table 52 and corresponding to the manually selected emergency category item, and add the acquired information to the emergency report based on the manual operation to be generated.

Thus, the emergency report based on the manual operation generated by the vehicle ECU 31 may include information on the emergency category item selected by the occupant and information associated therewith.

For example, in a case where the occupant manually operates the automobile 2's getting stuck button, the vehicle ECU 31 may read, from the associated information in FIG. 7 held in the vehicle memory 32, the weight of the automobile 2 and the vehicle class of the automobile 2 that may be used in responding to the getting stuck, and add the read information to the emergency report based on the manual operation.

In a case where the occupant manually operates the automobile 2's flat battery button, the vehicle ECU 31 may read, from the associated information in FIG. 7 held in the vehicle memory 32, the size of the battery and the output voltage of the battery that may be used in responding to the flat battery, and add the read information to the emergency report based on the manual operation.

In a case where the occupant manually operates the automobile 2's fuel exhaustion button, the vehicle ECU 31 may read, from the associated information in FIG. 7 held in the vehicle memory 32, the type of fuel and the capacity of the tank that may be used in responding to the fuel exhaustion, and add the read information to the emergency report based on the manual operation.

By such associated information being included in an emergency report together with information on a minor emergency category item, it is possible for the server 4 and the operator that receive the emergency report to appropriately select the emergency responder that is able to respond to an emergency, taking the associated information into account.

Figure 8:
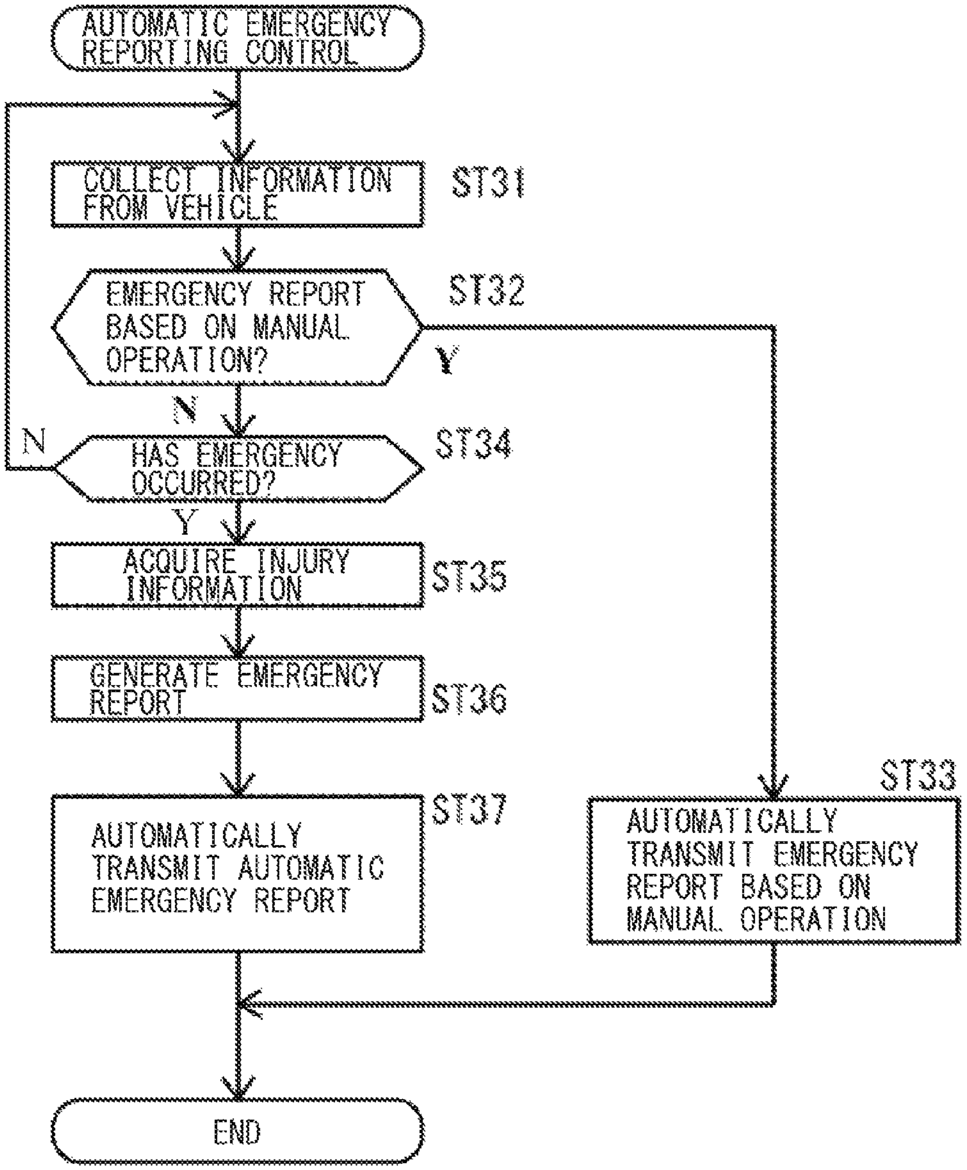
FIG. 8 is a flowchart illustrating automatic emergency reporting control that may be performed by the automobile illustrated in FIG. 1.

FIG. 8 is a flowchart illustrating automatic emergency reporting control that may be performed by the automobile 2 illustrated in FIG. 1.

The vehicle ECU 31 of the automobile 2 may repeatedly execute the automatic emergency reporting control illustrated in FIG. 8 to automatically transmit an emergency report on the basis of automatic detection of an emergency as illustrated in FIG. 4.

In step ST31, the vehicle ECU 31 may collect information from the automobile 2 as in step ST4. Note that, in step ST31, the vehicle ECU 31 may also acquire information on detection of the collision of the automobile 2 as in step ST3. The vehicle ECU 31 may also acquire information on the emergency report based on the manual operation generated in the processes of FIG. 5.

In step ST32, the vehicle ECU 31 may determine whether an emergency report based on a manual operation has been generated. The vehicle ECU 31 may check whether an emergency report based on a manual operation has been generated, for example, on the basis of data held in the vehicle memory 32. If an emergency report based on a manual operation has been generated (ST32: Y), the vehicle ECU 31 may refrain from transmitting the automatic emergency report, and cause the flow to proceed to step ST33 to transmit the emergency report based on the manual operation. If an emergency report based on a manual operation has not been generated (ST32: N), the vehicle ECU 31 may cause the flow to proceed to step ST34 to transmit the automatic emergency report.

In step ST33, the vehicle ECU 31 may read and acquire the emergency report based on the manual operation from the vehicle memory 32, and cause the mobile communicator 33 to transmit the emergency report based on the manual operation to the server 4. The vehicle ECU 31 may cause the mobile communicator 33 to transmit only the emergency report based on the manual operation to the server 4. This emergency report based on the manual operation may include, together with the emergency category item selected by the occupant, the associated information related to the emergency category item. Thereafter, the vehicle ECU 31 may end this control.

In step ST34, the vehicle ECU 31 of the automobile 2 may determine whether an emergency for which an emergency report is to be made has occurred, as in step ST5. The vehicle ECU 31 may determine whether an emergency for which an emergency report is to be made has occurred, for example, on the basis of a degree of impact applied by the collision, or presence or absence of consciousness or a motion of the occupant, such as the owner.

The vehicle ECU 31 may determine whether the collision of the automobile 2 has been detected, as an example of the emergency. The vehicle ECU 31 may determine that the collision of the automobile 2 has been detected, for example, if the detection value of the acceleration sensor 36 exceeds the threshold, as in step ST3.

If an emergency for which an emergency report is to be made has not occurred (ST34: N), the vehicle ECU 31 may cause the flow to return to step ST31. Thus, the vehicle ECU 31 may repeat the processes of step ST31, step ST32, and step ST34.

If an emergency for which an emergency report is to be made has occurred (ST34: Y), the vehicle ECU 31 may cause the flow to proceed to step ST35.

In step ST35, the vehicle ECU 31 of the automobile 2 may acquire the injury information of the occupant, as in step ST6. For example, the vehicle ECU 31 may acquire, as the injury information of the occupant, the information about the state of the occupant after the collision detection acquired in step ST31.

In step ST36, the vehicle ECU 31 may generate information for the automatic emergency report. For example, the information on the automatic emergency report may include, together with information indicating that the emergency report is an automatic emergency report, information such as the detection value of the acceleration sensor 36 upon collision or a collision level determination result. The detection value may have been used by the vehicle ECU 31 for the automatic detection of the emergency. The vehicle ECU 31 may temporarily record the automatic emergency report in the vehicle memory 32.

In step ST37, the vehicle ECU 31 of the automobile 2 may cause the mobile communicator 33 to automatically transmit the automatic emergency report to the server 4.

Figure 9:
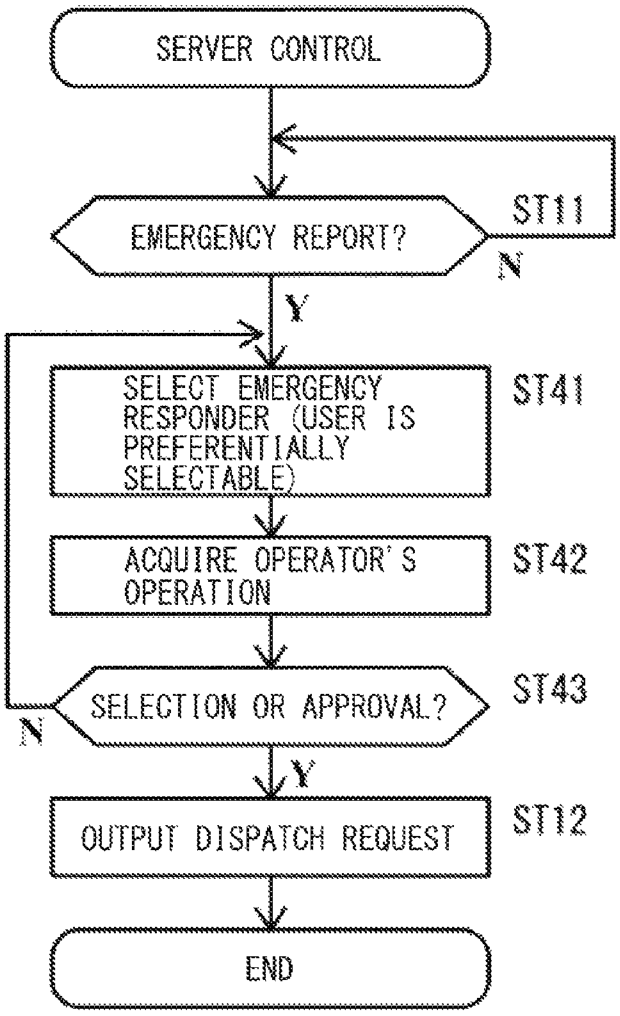
FIG. 9 is a flowchart illustrating server control that may be performed for an emergency report by the server illustrated in FIG. 1.

FIG. 9 is a flowchart illustrating server control that may be performed for an emergency report by the server 4 illustrated in FIG. 1.

The CPU 11 of the server 4 may repeatedly execute the control illustrated in FIG. 9 to respond to an emergency report as illustrated in FIG. 4.

Step ST11 may correspond to step ST11 of the automatic emergency reporting in FIG. 4.

If an emergency report is received and acquired in step ST11 (ST11: Y), the CPU 11 of the server 4 may cause the flow to proceed to step ST41.

In step ST41, the CPU 11 of the server 4 may analyze the received emergency report to acquire information, and select the emergency responder to be dispatched in emergency in response to the received emergency report. The CPU 11 of the server 4 may read the information on the plurality of emergency responders from the memory 12, and select the emergency responder that is available for the information included in the received emergency report. The CPU 11 of the server 4 may select two or more available emergency responders.

For example, in a case where an emergency report based on a manual operation and generated by the occupant manually operating the automobile 2's getting stuck button has been received, the CPU 11 of the server 4 may select the emergency responder that is available for the weight and the vehicle class of the automobile 2 included in the emergency report together with the information on the getting stuck.

In a case where an emergency report based on a manual operation and generated by the occupant manually operating the automobile 2's flat battery button has been received, the CPU 11 of the server 4 may select the emergency responder that is able to provide a battery with the battery size and the output voltage included in the emergency report together with the information on the flat battery. In another example, the CPU 11 may select the emergency responder that uses another automobile including a battery that is available for the output voltage together with a booster cable.

In a case where an emergency report based on a manual operation and generated by the occupant manually operating the automobile 2's fuel exhaustion button has been received, the CPU 11 of the server 4 may select the emergency responder that is available for the type of fuel and the tank capacity included in the emergency report together with the information on the fuel exhaustion.

In step ST42, the CPU 11 of the server 4 may acquire the operator's approval operation about the selected emergency responder. The operator may check information on the emergency report and information on the selected emergency responder on the display device 15 of the server 4, and operate the operation device 16 of the server 4. Note that the operator may check the information on the emergency report and the information on the emergency responder on the display device 15 of the operator terminal 3, and operate the operation device 16 of the operator terminal 3. In this case, the CPU 11 of the server 4 may acquire the operator's operation through the communication device 17 of the operator terminal 3 and the communication device 17 of the server 4.

In step ST43, the CPU 11 of the server 4 may determine whether the acquired operator's operation is approval or selection about the emergency responder selected in step ST41. If the operation is not an approval operation or a selection operation about the emergency responder (ST43: N), the CPU 11 of the server 4 may cause the flow to return to step ST41. The CPU 11 of the server 4 may repeat the processes of step ST41 to step ST43 until approval or selection about the emergency responder is obtained. If an approval operation or a selection operation about the emergency responder is performed (ST43: Y), the CPU 11 of the server 4 may cause the flow to proceed to step ST12.

In step ST12, the CPU 11 of the server 4 may output a dispatch request for an emergency response to the approved emergency responder.

In response to the dispatch request, a dispatch team, etc. may head to the location of the automobile 2 from which the emergency report has been received, with the information included in the emergency report, for example, and execute the emergency response.

For example, in a case where the automobile 2 is stuck, the dispatch team, etc. may couple together the stuck automobile 2 and its own vehicle with a pull rope, and move the stuck automobile 2 by means of the own vehicle. This resolves the emergency of the stuck automobile 2.

In a case where the battery of the automobile 2 is flat, the dispatch team, etc. may replace the battery of the automobile 2 with a new battery. In another example, the dispatch team, etc. may couple together the battery of the automobile 2 and a battery of the own vehicle with a booster cable, and charge the battery of the automobile 2.

In a case where the fuel of the automobile 2 is exhausted, the dispatch team, etc. may provide brought fuel or a part of fuel of the own vehicle to the automobile 2 whose fuel is exhausted.

It is thus possible to resolve a simple emergency involving the automobile 2.

FIG. 10 is an explanatory diagram illustrating an example of an emergency responder table 61 that is held in the memory 12 of the server 4 illustrated in FIG. 1.

The CPU 11 of the server 4 may use the information included in the received emergency report to select, from information on a plurality of emergency responders held in the emergency responder table 61 of the memory 12, one or more candidate emergency responders to be called out in response to the received emergency report.

Note that the CPU 11 of the server 4 may select the emergency responder to be actually called out, from the information on the plurality of emergency responders held in the emergency responder table 61 of the memory 12.

The emergency responder table 61 in FIG. 10 may hold information on one emergency responder in a record in each row. The record of each emergency responder may include identification information, such as a name, of the emergency responder, information on an emergency to which the emergency responder is able to respond, and position information of the emergency responder.

The record in the first row of FIG. 10 may include, as information on a dispatch team (business entity) called a "first wrecker", information indicating the ability to respond to getting stuck without weight limitation and an address indicating the location of the dispatch team.

The record in the second row may include, as information on a dispatch team (business entity) called a "second wrecker", information indicating the ability to respond to getting stuck of the automobile 2 with a weight up to 2 tons and an address indicating the location of the dispatch team.

The record in the third row to the record in the fourth row may also include information on dispatch teams (business entities).

In contrast, the record in the fifth row may include information on a user (individual) that uses another automobile, instead of a dispatch team (business entity). For example, the record in the fifth row may include, as information on a user (individual) called a "first user", information indicating that the user uses the other automobile of a vehicle type "SUV", possesses a booster cable, and uses an electric vehicle, and information on the current location of the other automobile. The current location of the other automobile may be a position based on a latitude and a longitude obtained by, for example, the vehicle GNSS receiver 34.

The record in the sixth row to the record in the eighth row may also include information on users (individuals) that use other automobiles.

The memory 12 of the server 4 may thus hold, as the information on the plurality of emergency responders that are able to be called out, information on a user of another automobile, together with information on a dispatch team that is able to respond in emergency.

In this case, the CPU 11 of the server 4 may select, in step ST41 in FIG. 9, the most suitable emergency responder on the basis of the information on the emergency report based on the manual operation.

For example, in a case where the emergency category item included in the emergency report is getting stuck of the automobile 2, the CPU 11 of the server 4 may extract and select, from the emergency responder table 61 in FIG. 10, the emergency responder that is available for the weight or the vehicle class of the automobile 2 included as the associated information. In a case where the weight of the stuck automobile 2 is greater than 2 tons, the CPU 11 of the server 4 may select, from the emergency responder table 61 in FIG. 10, the dispatch team (business entity) "first wrecker" that is able to respond to the getting stuck. The CPU 11 of the server 4 may also select, for example, the users (individuals) "first user", "second user", and "third user" that use a SUV or a truck, as the emergency responder.

Furthermore, in place of the operator, the CPU 11 of the server 4 may select, on a top-priority basis, the emergency responder present nearest to the location of the site where the automobile 2 is stuck, from among the emergency responders that are able to respond. Such prioritized selection makes it more likely that the CPU 11 of the server 4 is able to select information on a user of another automobile preferentially over a dispatch team that is able to respond in emergency. In addition, in a case where information on a user of another automobile whose performance is available for the associated information is included in the selected emergency responders, the CPU 11 of the server 4 may select the information on the user of the other automobile preferentially over a dispatch team that is able to respond in emergency.

In a case where the emergency category item included in the emergency report is a flat battery of the automobile 2, the CPU 11 of the server 4 may extract and select, from the emergency responder table 61 in FIG. 10, the emergency responder that is able to provide a battery with the size included as the associated information. The CPU 11 of the server 4 may select, from the emergency responder table 61 in FIG. 10, the dispatch team (business entity) "first road service" that is able to provide a battery with the size serving as the associated information. The CPU 11 of the server 4 may also select, for example, the users (individuals) "first user" and "second user" that use other automobiles matching the output voltage of the battery included as the associated information and are able to provide a booster cable, as the emergency responder.

Furthermore, in place of the operator, the CPU 11 of the server 4 may select, on a top-priority basis, the emergency responder present nearest to the location of the site where the automobile 2 is stopped, from among the emergency responders that are able to respond.

In a case where the emergency category item included in the emergency report is fuel exhaustion of the automobile 2, the CPU 11 of the server 4 may extract and select, from the emergency responder table 61 in FIG. 10, the emergency responder that is able to provide fuel of the type included as the associated information. The CPU 11 of the server 4 may select, from the emergency responder table 61 in FIG. 10, the dispatch team (business entity) "first fuel service" that is able to provide fuel of the type serving as the associated information. The CPU 11 of the server 4 may also select, for example, the users (individuals) "second user" and "fourth user" that use other automobiles matching the type of fuel included as the associated information and are able to provide a booster cable, as the emergency responder.

Furthermore, in place of the operator, the CPU 11 of the server 4 may select, on a top-priority basis, the emergency responder present nearest to the location of the site where the automobile 2 is stopped, from among the emergency responders that are able to respond.

As described above, in the example embodiment, in a case where the SOS switch 43 serving as the emergency reporting switch is manually operated by the occupant of the automobile 2, the vehicle ECU 31 presents the plurality of emergency category items to allow the occupant to select the emergency category item on the user interface (e.g., the vehicle display device 41 and the vehicle operation device 42), generates an emergency report based on a manual operation about the emergency category item selected by the occupant, and causes the mobile communicator 33 to transmit the emergency report based on the manual operation. This enables the CPU 11 of the server 4 that receives an emergency report from the automobile 2 to determine that the received emergency report is based on the emergency category item manually selected by the occupant of the automobile 2 involved in an emergency. It is thus possible to distinguish such an emergency report from another emergency report, for example, an emergency report based on emergency detection and transmitted automatically.

The vehicle ECU 31 may present, for example, as the plurality of emergency category items from which one emergency category item is selectable on the user interface (e.g., the vehicle display device 41 and the vehicle operation device 42), only simple emergency category items about the automobile 2 to which a user of another automobile is able to respond. Non-limiting examples of such emergency category items may include getting stuck, a flat battery, and fuel shortage of the automobile 2. This enables the server 4 that receives an emergency report from the automobile 2 to assume that the emergency report based on the manually selected emergency category item is an emergency report about a simple emergency. The server 4 may thus select, for example, a user of another automobile present near the automobile 2 involved in the emergency as the emergency responder, instead of a specialized emergency response dispatch team, and make a dispatch request. The server 4 is able to select the emergency responder not limited to a specialized emergency response dispatch team, and make various responses for the emergency involving the automobile 2.

For example, information such as the weight and/or the vehicle class of the automobile 2, the battery size and/or the output voltage of the automobile 2, or the fuel type and/or the tank capacity of the automobile 2 may be acquirable, as the associated information included in the emergency report and related to the emergency category item selected by the occupant. In that case, the CPU 11 of the server 4 may select, as the emergency responder, a user of another automobile whose performance allows for a response to the emergency, on the basis of the associated information, and make a dispatch request. This enables the user of the other automobile that heads to the site in response to the dispatch request to respond to the emergency.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

Each of the CPU 11 illustrated in FIG. 2 and the vehicle ECU 31 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the CPU 11 and the vehicle ECU 31. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of each of the CPU 11 illustrated in FIG. 2 and the vehicle ECU 31 illustrated in FIG. 3.

The invention claimed is:

1. A vehicle with an emergency reporting function, the vehicle comprising:

a vehicle communicator configured to transmit an emergency report about an emergency involving the vehicle to a server to make a request for an emergency response;

an emergency reporting switch manually operable by an occupant of the vehicle;

a user interface provided in the vehicle to be used by the occupant of the vehicle; and a processor configured to generate the emergency report and cause the vehicle communicator to transmit the emergency report, wherein, in a case where the emergency reporting switch is manually operated by the occupant of the vehicle, the processor is configured to present emergency category items to allow the occupant to select an emergency category item among the emergency category items on the user interface, generate the emergency report based on a manual operation about the emergency category item selected by the occupant, the emergency report including information indicating that the emergency report is generated based on the manual operation, and cause, based on determining that the emergency report based on the manual operation has been generated, the vehicle communicator to transmit the emergency report based on the manual operation to the server.

2. The vehicle with the emergency reporting function, according to claim 1, wherein the processor is configured to present, on the user interface, getting stuck, a flat battery, and fuel shortage of the vehicle, as the emergency category items.

3. The vehicle with the emergency reporting function, according to claim 1, further comprising a detector configured to detect the emergency involving the vehicle, wherein the processor is configured to, in a case where the emergency involving the vehicle is detected by the detector, generate an automatic emergency report about the emergency involving the vehicle, the automatic emergency report including information indicating that the emergency report is automatically generated, and cause the vehicle communicator to automatically transmit the automatic emergency report to the server, and, in the case where the emergency reporting switch is manually operated by the occupant of the vehicle, cause the vehicle communicator to transmit only the emergency report based on the manual operation about the emergency category item selected by the occupant to the server, without transmitting the automatic emergency report.

4. The vehicle with the emergency reporting function, according to claim 2, further comprising a detector configured to detect the emergency involving the vehicle, wherein the processor is configured to, in a case where the emergency involving the vehicle is detected by the detector, generate an automatic emergency report about the emergency involving the vehicle, the automatic emergency report including information indicating that the emergency report is automatically generated, and cause the vehicle communicator to automatically transmit the automatic emergency report to the server, and, in the case where the emergency reporting switch is manually operated by the occupant of the vehicle, cause the vehicle communicator to transmit only the emergency report based on the manual operation about the emergency category item selected by the occupant to the server, without transmitting the automatic emergency report.

5. The vehicle with the emergency reporting function, according to claim 3, further comprising a memory configured to hold, as associated information related to each of the emergency category items to be presented on the user interface, at least one of a weight of the vehicle, a vehicle class of the vehicle, a size of a battery of the vehicle, an output voltage of the battery, a fuel type of the vehicle, or a tank capacity of a fuel tank of the vehicle, wherein the processor is configured to acquire the associated information related to the emergency category item selected by the occupant from the memory, and cause the vehicle communicator to transmit the associated information together with the emergency category item selected by the occupant to the server, as the emergency report based on the manual operation.

6. The vehicle with the emergency reporting function, according to claim 4, further comprising a memory configured to hold, as associated information related to each of the emergency category items to be presented on the user interface, at least one of a weight of the vehicle, a vehicle class of the vehicle, a size of a battery of the vehicle, an output voltage of the battery, a fuel type of the vehicle, or a tank capacity of a fuel tank of the vehicle, wherein the processor is configured to acquire the associated information related to the emergency category item selected by the occupant from the memory, and cause the vehicle communicator to transmit the associated information together with the emergency category item selected by the occupant to the server, as the emergency report based on the manual operation.

7. The vehicle with the emergency reporting function according to claim 1, wherein the emergency reporting switch is an independent physical button provided on a steering wheel or a shift knob.

8. The vehicle with the emergency reporting function according to claim 1, wherein the emergency reporting switch is provided separately from the user interface.

9. The vehicle with the emergency reporting function according to claim 1, further comprising a vehicle memory and an acceleration sensor, wherein the processor is configured to:

present, on the user interface, getting stuck, a flat battery, and fuel shortage of the vehicle, as the emergency category items;

cause the vehicle memory to store data on the emergency report based on the manual operation;

determine, based on determining that a detection value of the acceleration sensor exceeds the threshold, whether the emergency report based on the manual operation has been generated based on the data held in the vehicle memory;

generate, based on (i) detecting the emergency involving the vehicle, and (ii) determining that the emergency report based on the manual operation has not been generated, an automatic emergency report about the emergency involving the vehicle, the automatic emergency report including information indicating that the emergency report is automatically generated;

cause, based on the determining that the emergency report based on the manual operation has been generated, the vehicle communicator to transmit only the emergency report based on the manual operation among the emergency report based on the manual operation and the automatic emergency report to the server; and cause, based on generating the automatic emergency report, the vehicle communicator to transmit only the automatic emergency report among the emergency report based on the manual operation and the automatic emergency report to the server.

10. The vehicle with the emergency reporting function according to claim 9, wherein:

the processor is configured to acquire information on a state of the occupant generated based on a captured image of the occupant, the automatic emergency report includes the information on the state of the occupant, and the emergency report based on the manual operation includes no information based on any captured image of the occupant.

* * * * *